United States Patent
Omi et al.

(10) Patent No.: US 7,799,887 B2
(45) Date of Patent: Sep. 21, 2010

(54) SILICON-CONTAINING CURABLE COMPOSITION AND ITS CURED PRODUCT

(75) Inventors: Jinichi Omi, Tokyo (JP); Koichi Sakamaki, Tokyo (JP); Hiroshi Morita, Tokyo (JP); Masako Saito, Tokyo (JP)

(73) Assignee: Adeka Corporation, Tokyo (JP)

( * ) Notice: Subject to any disclaimer, the term of this patent is extended or adjusted under 35 U.S.C. 154(b) by 377 days.

(21) Appl. No.: 11/815,564

(22) PCT Filed: Feb. 14, 2006

(86) PCT No.: PCT/JP2006/302513

§ 371 (c)(1),
(2), (4) Date: Aug. 6, 2007

(87) PCT Pub. No.: WO2006/090609

PCT Pub. Date: Aug. 31, 2006

(65) Prior Publication Data

US 2009/0012256 A1 Jan. 8, 2009

(30) Foreign Application Priority Data

Feb. 24, 2005 (JP) .............................. 2005-048747

(51) Int. Cl.
C08G 77/50 (2006.01)
(52) U.S. Cl. .............................. 528/31; 528/15; 528/25; 528/37; 528/40
(58) Field of Classification Search .................... 528/15, 528/25, 31–33, 37
See application file for complete search history.

(56) References Cited

U.S. PATENT DOCUMENTS

| | | | |
|---|---|---|---|
| 3,198,766 A * | 8/1965 | Nitzsche et al. | ................ 528/15 |
| 3,438,936 A | 4/1969 | Lamoreaux | |
| 2004/0214966 A1 | 10/2004 | Tabei et al. | |
| 2005/0038221 A1 | 2/2005 | Tabei et al. | |
| 2006/0243947 A1* | 11/2006 | Tsumura et al. | ........ 252/299.01 |

FOREIGN PATENT DOCUMENTS

| | | | |
|---|---|---|---|
| JP | 8-157603 A | | 6/1996 |
| JP | 11-199677 A | | 7/1999 |
| JP | 2002-194215 A | | 7/2002 |
| JP | 2002-241501 A | | 8/2002 |
| JP | 2002-241614 A | | 8/2002 |
| JP | 2004-339482 A | | 12/2004 |
| JP | 2005-298606 A | | 10/2005 |

OTHER PUBLICATIONS abstract for JP 2005-307064.*
Pinho et al., "Hybrid materials derived from divinylbenzene and cyclic siloxane," Eur. Polymer J., vol. 40, pp. 615-622 (2004).
Chinese Patent issued a Chinese Office Action dated Nov. 6, 2009, Application No. 200680039236.

* cited by examiner

*Primary Examiner*—Marc S Zimmer
(74) *Attorney, Agent, or Firm*—Young & Thompson

(57) ABSTRACT

A silicon-containing curable composition, comprising:
a prepolymer (A) containing two or more Si—H groups per molecule obtained by hydrosilylation reaction of one kind or more selected from each of components ($\alpha$) and components ($\beta$) described below;
   a cyclic siloxane compound (B) containing per molecule two or more carbon-carbon double bonds that have reactivity to the Si—H groups; and a hydrosilylation catalyst (C);
wherein the component ($\alpha$) is a cyclic siloxane compound represented by formula (1) and contains two or more Si—H groups per molecule, $$\left[ \begin{array}{c} R^1 \\ | \\ Si-O \\ | \\ H \end{array} \right]_a \left[ \begin{array}{c} R^2 \\ | \\ Si-O \\ | \\ R^3 \end{array} \right]_b \quad \text{Formula (1)}$$

wherein $R^1$, $R^2$ and $R^3$ each are an alkyl group having 1 to 6 carbon atoms or a phenyl group, may be the same or different, a is any number of 2 to 10, b is any number of 0 to 8, and $a+b \geq 2$, and
wherein the component ($\beta$) is a compound containing per molecule two or more carbon-carbon double bonds that have reactivity to the Si—H groups.

14 Claims, No Drawings

SILICON-CONTAINING CURABLE COMPOSITION AND ITS CURED PRODUCT

FIELD OF THE INVENTION

The present invention relates to a silicon-containing curable composition and its cured product. More specifically, the present invention relates to a silicon-containing curable composition useful as an electrical and electronic material, and to its cured product.

BACKGROUND ART

Various studies have been made on silicon-containing compounds. In the industrial field, polysiloxane compounds as represented by silicone resin have been used through the years. The silicone resin is excellent in heat resistance and flexibility, but has limitations for use in applications such as production processes of electronic members because of the problem of contamination due to a large amount of outgassing moieties (volatile content).

Further in recent years, with the advancement in the electronic information field, high performance has been requested. To meet this request, the arts providing high performances in heat resistance, transparency, and physical and electrical properties have been studied based on the characteristic properties of silicon. Among the arts, there have been studied various kinds of arts producing useful compounds by applying hydrosilylation reaction of silicon compounds. In the processes of producing members in the electronic information field, lithographic processes have been used in many cases, where high resistances against alkali and solvent have become requested. In this way, there has been requested a material that satisfies high heat resistance, crack resistance, and transparency while keeping high resistances against alkali and solvent. To meet these requests, various kinds of silicon-containing curable compositions have been proposed (see Patent Documents 1 to 3, and Non-Patent Document 1).

However, these proposed arts each have a characteristic aspect, but none of them satisfy at the same time the requirement needed for the material in the recent electronic information field, that is, high resistances against heat, alkali and crack, and an extremely low outgassing content.

For instance, the material proposed in Patent Document 1 does not have sufficient heat resistance, crack resistance, and particularly alkali resistance. The material proposed in Patent Document 2 also does not have sufficient alkali resistance in particular. The material proposed in Patent Document 3 also does not have sufficient crack resistance and particularly alkali resistance.

Patent Document 1: Japanese Patent Laid-Open Publication No. 2002-241614

Patent Document 2: Japanese Patent Laid-Open Publication No. 2002-241501

Patent Document 3: Japanese Patent Laid-Open Publication No. 2002-194215

Non-Patent Document 1: European Polymer Journal 40 (2004) 615-622

DISCLOSURE OF THE INVENTION

Therefore, an object of the present invention is to provide a silicon-containing curable composition having a low outgassing content and excellent transparency with its cured product having a high heat resistance, excellent resistances against alkali and crack, useful for electrical, electronic materials and others.

The present inventors have made an intensive study to address the above-mentioned problems and focused on the structure and prepolymer of a specific silicon-containing compound to accomplish the present invention.

Namely, the present invention provides a silicon-containing curable composition, comprising: a prepolymer (A) containing two or more Si—H groups per molecule obtained by hydrosilylation reaction of one kind or more selected from each of components (α) and components (β) described below; a cyclic siloxane compound (B) containing per molecule two or more carbon-carbon double bonds that have reactivity to Si—H groups; and a hydrosilylation catalyst (C).

The component (α) is a cyclic siloxane compound represented by formula (1) and contains two or more Si—H groups per molecule.

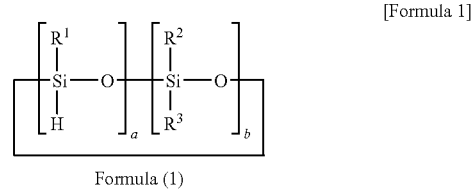

Formula (1)

[In the formula (1), $R^1$, $R^2$ and $R^3$ each are an alkyl group having 1 to 6 carbon atoms or a phenyl group, may be the same or different, a is any number of 2 to 10, b is any number of 0 to 8, and a+b≧2.]

The component (β) is a compound containing per molecule two or more carbon-carbon double bonds that have reactivity to the Si—H groups.

Further, the present invention provides the silicon-containing curable composition, wherein the component (β) is a compound that is represented by any of formulas (2) to (4) and contains per molecule two carbon-carbon double bonds having reactivity to Si—H groups;

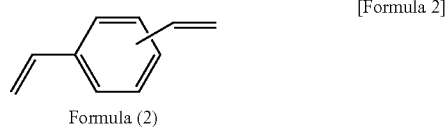

Formula (2)

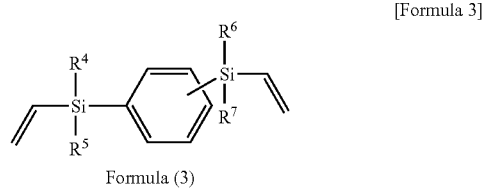

Formula (3)

[In the formula (3), $R^4$, $R^5$, $R^6$ and $R^7$ each are an alkyl group having 1 to 6 carbon atoms or a phenyl group, and may be the same or different.]

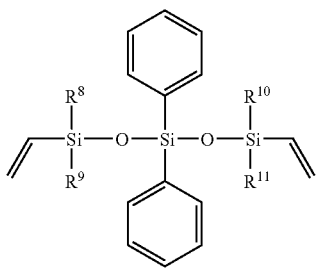

Formula (4)

[In the formula (4), $R^8$, $R^9$, $R^{10}$ and $R^{11}$ each are an alkyl group having 1 to 6 carbon atoms or a phenyl group, and may be the same or different.]

Still further, the present invention provides the silicon-containing curable composition, wherein the component (B) is a cyclic siloxane compound that is represented by formula (5) and contains per molecule two or more carbon-carbon double bonds having reactivity to Si—H groups.

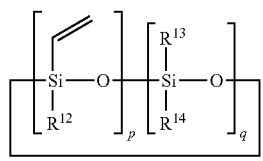

Formula (5)

[In the formula (5), $R^{12}$, $R^{13}$ and $R^{14}$ each are an alkyl group having 1 to 6 carbon atoms or a phenyl group, and may be the same or different, p is any number of 2 to 10, q is any number of 0 to 8, and $p+q \geqq 2$.]

Still furthermore, the present invention provides a cured product obtained by curing the silicon-containing curable composition.

The present invention provides a silicon-containing curable composition having a low outgassing content and excellent transparency with its cured product having high heat resistance and adequate resistances against alkali and crack, advantageously used for electrical and electronic materials including insulating films, low-dielectric constant material, heat-resistant material, and transparent material.

BEST MODE FOR CARRYING OUT THE INVENTION

The present invention will be described in detail below.

Firstly, a prepolymer that is a component (A) of the present invention is described. The component (A) prepolymer of the present invention is obtained by reacting one kind or more selected from the following component (α) and one kind or more selected from the following component (β) through hydrosilylation, and has two or more Si—H groups per molecule.

The component (α) is represented by formula (1) and is a cyclic siloxane compound containing two or more Si—H groups per molecule. In formula (1), $R^1$, $R^2$ and $R^3$ each are an alkyl group having 1 to 6 carbon atoms or a phenyl group, and may be the same or different. $R^1$ is preferably methyl group in view of industrial availability. $R^2$ and $R^3$ each are preferably methyl group or phenyl group in view of lowering outgassing. "a" represents any number of 2 to 10, "b" represents any number of 0 to 8, and $a+b \geqq 2$. "a" is preferably 4 to 6 in view of easiness of preparation. "b" is preferably 0 to 1 in view of the cross-linking density in curing reaction.

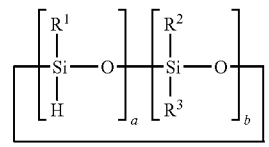

Formula (1)

A specific example of the component (α) includes 1,3,5,7-tetramethylcyclotetrasiloxane, 1,3,5,7,9-pentamethylcyclopentasiloxane, and 1,3,5,7,9,11-hexamethylcyclohexasiloxane. Because of industrial availability and an adequate number of Si—H groups, 1,3,5,7-tetramethylcyclotetrasiloxane is preferable. The component (α) may be used alone or in combination with two or more kinds.

A component (β) is a compound containing per molecule two or more carbon-carbon double bonds that have reactivity to Si—H groups. An example particularly preferable in view of heat resistance and crack resistance include a compound represented by any of formulas (2) to (4).

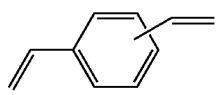

Formula (2)

A compound which is a component (β) and represented by formula (2) represents divinylbenzene and may be any of o-divinylbenzene, m-divinylbenzene and p-divinylbenzene, and also may be a compound having a functional group (for example an alkyl group such as methyl group) bonded to benzene ring other than vinyl groups, and a mixture thereof.

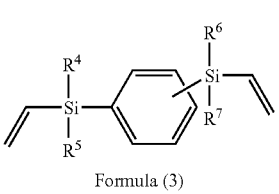

Formula (3)

In formula (3), $R^4$, $R^5$, $R^6$ and $R^7$ each are an alkyl group having 1 to 6 carbon atoms or a phenyl group, and may be the same or different. In view of easiness of preparation and industrial availability, methyl group or ethyl group is preferable. An example of the compound represented by formula (3) include preferably a compound represented by formula (6).

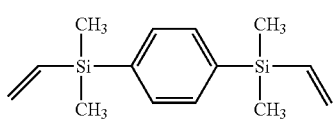

Formula (6)

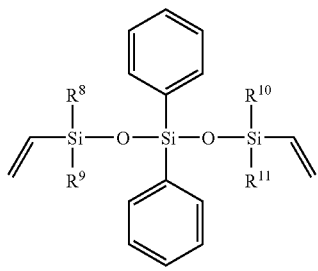

Formula (4)

In formula (4), $R^8$, $R^9$, $R^{10}$ and $R^{11}$ each represent an alkyl group having 1 to 6 carbon atoms or a phenyl group, may be the same or different. In view of industrial availability, methyl group or ethyl group is preferable. An example of the compound represented by formula (4) include preferably a compound represented by formula (7).

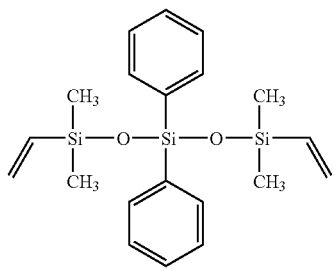

Formula (7)

The component (β) may be any compound that contains per molecule two or more carbon-carbon double bonds having reactivity to Si—H groups, besides the compounds described above. As a specific example, there may be mentioned butadiene, isoprene, vinylcyclohexene, cyclopentadiene, dicyclopentadiene, cyclohexadiene, decadiene, diallylphthalate, trimethylolpropane diallylether, pentaerythrytol triallylether, divinylbenzenes (having a purity of 50 to 100% and preferably 80 to 100%), divinylbiphenyls (having a purity of 50 to 100% and preferably 80 to 100%), 1,3-diisopropenylbenzene, 1,4-diisopropenylbenzene, triallylisocyanurate, trivinylcyclohexane, and oligomers thereof; 1,2-polybutadiene (having an 1,2-ratio of 10 to 100%, and of preferably 50 to 100%); and a compound having two carbon-carbon double bonds in a spiro skeleton (for example, 3,9-divinyl-2,4,8,10-tetraoxaspiro[5,5]undecane and the like). The component (β) may be used alone or in combination with two or more kinds.

The number of the carbon-carbon double bonds that are contained in the component (β) and have reactivity to Si—H groups may be at least 2 on average per molecule, but preferably 2 to 3 in the viewpoint of cross-linking density.

The component (A) prepolymer of the present invention can be obtained by reacting the above-mentioned component (α) and component (β) through hydrosilylation. The blending ratio of component (α) and component (β) is not particularly limited, but the ratio may be selected in a manner that the component (A) prepolymer contains two or more Si—H groups per molecule. Preferably, from the viewpoint of the viscosity of the prepolymer, the ratio of X:Y is 10:1 to 2:1, and preferably 4:1 to 2:1, where X is the number of Si—H groups contained in a component (α) and Y is the number of the carbon-carbon double bonds that have reactivity to Si—H groups contained in a component (β).

In addition, the concentration of Si—H groups contained in the component (A) prepolymer of the present invention is, from the viewpoint of curing property and storage stability, preferably 0.0001 mmol/g to 100 mmol/g, and more preferably 0.01 mmol/g to 20 mmol/g.

The component (A) prepolymer of the present invention has a weight average molecular weight of preferably 500 to 500,000, and more preferably 1,000 to 300,000 from the viewpoint of heat resistance and handling property. The weight average molecular weight of the present prepolymer can be measured with GPC in terms of polystyrene.

Hydrosilylation reaction between the component (α) and component (β) may be performed using a platinum-based catalyst. As the platinum-based catalyst, can be used a known catalyst containing one kind or more of metal selected from platinum, palladium and rhodium that promote the hydrosilylation reaction. As these platinum-based catalysts used for the hydrosilylation reaction, there may be mentioned not only a platinum-based catalyst such as a platinum-carbonylvinylmethyl complex, a platinum-divinyltetramethyldisiloxane complex, a platinum-cyclovinylmethylsiloxane complex and a platinum-octylaldehyde complex, but also a compound that contains a platinum-family metal such as palladium and rhodium in place of platinum. These catalysts may be used alone or in combination with two or more kinds. In particular, from the viewpoint of curing property, a catalyst containing platinum is preferable, specifically, the platinum-divinyltetramethyldisiloxane complex (Karstedt catalyst) and the platinum-carbonylvinylmethyl complex (Ossko catalyst) are preferable. In addition, so-called Wilkinson catalyst including chlorotristriphenylphosphine rhodium (I) or the like that contains the above-mentioned platinum-family metal is also included in the platinum-based catalyst of the present invention. The used amount of the platinum-based catalyst is, from the viewpoint of reactivity, preferably 5% by mass or less with respect to the total amount of the components (α) and (β), and more preferably 0.0001 to 1.0% by mass. The conditions for the hydrosilylation reaction between the components (α) and (β) are not particularly limited. The hydrosilylation may be performed under conventionally known conditions by using the above-mentioned catalysts, but from the viewpoint of curing speed, the hydrosilylation may be performed preferably at a temperature of from room temperature to 130° C. For the reaction, a conventionally known solvent such as toluene, hexane, MIBK (methylisobutylketone), cyclopentanone and PGMEA (propyleneglycol monomethyletheracetate) may be used.

The component (A) prepolymer of the present invention is a prepolymer that is obtained by reacting through hydrosilylation a component (α), a cyclic siloxane compound and a component (β), a compound containing two or more carbon-carbon double bonds that have reactivity to Si—H groups. The present invention is particularly characterized in that the component (α) is cyclic, and that the prepolymer is preliminary prepared and is used as a blending component for the curable composition. Since the cyclic structure allows low shrinkage on curing, a cured product having excellent crack resistance can be obtained. Further, since low boiling point moieties can be removed by preliminary preparation of the prepolymer, a curable composition free of outgassing moieties can be obtained. Still further, since the silicon content can be selected high with keeping the viscosity low, a curable composition having excellent heat resistance can be obtained.

Next, the component (B) of the present invention is described. The component (B) of the present invention is a cyclic siloxane compound containing per molecule two or more carbon-carbon double bonds that have reactivity to Si—H groups. The number of the carbon-carbon double bonds is preferably 2 to 10, and more preferably 2 to 6 from the viewpoint of the cross-linking density of a cured product. As the carbon-carbon double bonds that have reactivity to Si—H groups, there may be mentioned an alkenyl group, a vinyl group or the like, but preferably a vinyl group bonded to a silicon atom (Si—CH=CH$_2$ group) from the viewpoint of reactivity.

The component (B) include, particularly preferably from the viewpoint of the properties of a cured product, a cyclic siloxane compound represented by formula (5).

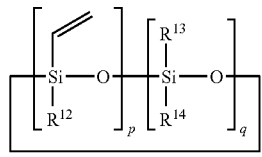

Formula (5)

[Formula 5]

In formula (5), $R^{12}$, $R^{13}$ and $R^{14}$ each are an alkyl group having 1 to 6 carbon atoms or a phenyl group, may be the same or different. In view of industrial availability, $R^{12}$, $R^{13}$ and $R^{14}$ are preferably methyl group or phenyl group. p represents any number of 2 to 10, and preferably 2 to 4 from the viewpoint of cross-linking density; q represents any number of 0 to 8, and preferably 1 to 3 from the viewpoint of outgassing reduction and viscosity; and p+q≧2. From the viewpoint of outgassing reduction, a preferable specific example of the component (B) include a cyclic siloxane compound that is represented by formulas (8) to (11).

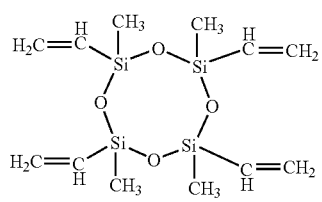

Formula (8)

[Formula 8]

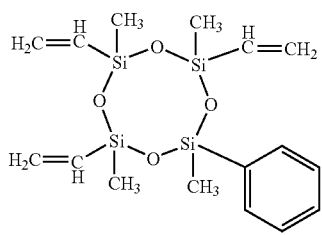

Formula (9)

[Formula 9]

-continued

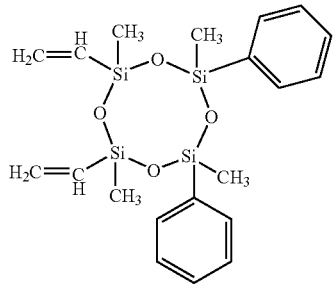

Formula (10)

[Formula 10]

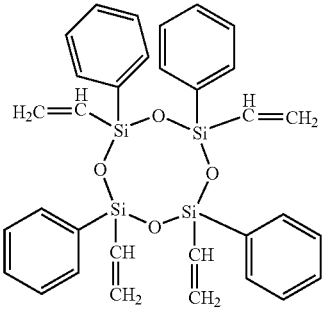

Formula (11)

[Formula 11]

The component (B) of the present invention is a cyclic siloxane compound containing per molecule two or more carbon-carbon double bonds that have reactivity to Si—H groups. The present invention is particularly characterized in that the component (B) is the cyclic siloxane compound. Since the component (B) is the siloxane compound, excellent heat resistance and transparency are obtained as opposed to the compound other than the siloxane compound. Since the component (B) is the cyclic compound, a cured product having excellent physical strength (rigidity), alkali resistance, and crack resistance and the like can be obtained as opposed to a chain compound.

Particularly excellent advantages that are attained by selecting as the compound (B) of the present invention the cyclic siloxane compound containing two or more carbon-carbon double bonds that have reactivity to Si—H groups are listed in detail below.

(1) The cyclic structure lowers the shrinking on curing, providing excellent crack resistance at high temperatures.

(2) A high silicon concentration can be selected, so that heat resistance is easily improved.

(3) The advantages such as transparency and heat resistance that are inherent in Si compounds can be exhibited without any limitation.

The amounts of the components (A) and (B) contained in the silicon-containing curable composition of the present invention can be selected as appropriate by taking into consideration the ratio of the Si—H groups to the carbon-carbon double bonds having reactivity to the Si—H groups, but the equivalent ratio of the Si—H groups to the carbon-carbon double bonds having reactivity to the Si—H groups is preferably 0.9 to 10, and particularly preferably 1.0 to 5.0. In terms of % by mass, the amount of component (A) is preferably 1 to 99% by mass, and particularly preferably 10 to 90% by mass. The amount of component (B) is preferably 1 to 99% by mass, and particularly preferably 10 to 90% by mass.

Next, the hydrosilylation catalyst, that is a component (C) of the present invention, is described.

As the component (C) hydrosilylation catalyst, there may be mentioned a platinum-based catalyst including a known catalyst containing at least one kind of metal selected from platinum, palladium and rhodium that promote the hydrosilylation reaction. The platinum-based catalyst used for the hydrosilylation reaction include not only a platinum-based catalyst such as platinum-carbonylvinylmethyl complex, platinum-divinyltetramethyldisiloxane complex, platinum-cyclovinylmethylsiloxane complex, and platinum-octylaldehyde complex, but also a compound that contains a platinum-family metal such as palladium and rhodium in place of platinum. These catalysts may be used alone or in combination with two or more kinds. In particular, from the viewpoint of curing property, a catalyst containing platinum is preferable, specifically, platinum-divinyltetramethyldisiloxane complex (Karstedt catalyst) and platinum-carbonylvinylmethyl complex (Ossko catalyst) are preferable. In addition, so-called Wilkinson catalyst including chlorotristriphenylphosphine rhodium (I) or the like that contains the above-mentioned platinum-family metal is also included in the platinum-based catalysts of the present invention.

The amount of component (C) contained in the silicon-containing curable composition of the present invention is, from the viewpoint of curing performance and storage stability, preferably 5% by mass or less, and more preferably 0.0001 to 1.0% by mass. When the amount exceeds 5% by mass, the silicon-containing curable composition tends to be unstable. When the amount is lower than 0.0001% by mass, sufficient curing performance is not sometimes attained.

The silicon-containing curable composition of the present invention preferably contains metal oxide fine powders (sometimes called as metal oxide fine particles) as an optional component besides the above-mentioned components (A) to (C). The metal oxide fine powders that are used as an arbitrary component of the present invention are inorganic materials such as so called fillers and minerals, and their organic modifiers. There may be mentioned, for example, colloidal silica, silica filler, silica gel, minerals such as mica and montmorillonite, metal oxides such as aluminum oxide, zinc oxide and beryllium oxide, or the like. These materials may be used after organic modification. Preferable properties can be attained by admixing these metal oxide fine powers. Silicon dioxide fine particles are particularly preferable. The diameter of these metal oxide fine particles is preferably 100 µm or smaller from the viewpoint of heat resistance, and more preferably 50 µm or smaller. The amount of the metal oxide fine powders admixed in the silicon-containing curable composition of the present invention is, from the viewpoint of heat resistance and handling, preferably 90% by mass or less, and more preferably 50% by mass or less.

A free-radical scavenger may be further admixed, as an optional component, in the silicon-containing curable composition of the present invention. As the free-radical scavenger, there may be mentioned an antioxidant such as an oxidation inhibitor and a stabilizer, for example, triethyleneglycol-bis[3-(3-t-butyl-5-methyl-4-hdyroxyphenyl) propionate], dibutylhydroxytoluene (BHT), 2,6-di-t-butyl-paracresol (DBPC), or the like. The amount of the free-radical scavenger admixed in the silicon-containing curable composition of the present invention is, from the viewpoint of heat resistance, electrical properties, curing property, mechanical property, storage stability, and handling, preferably 0.1 to 50% by mass, and more preferably 1 to 30% by mass.

Next, the cured product of the present invention is described.

The silicon-containing curable composition of the present invention can be cured by heating to provide a cured product. The composition may be cured by any method including a method where the components of the silicon-containing curable composition of the present invention is mixed immediately before use, and a method where all of the components are preliminary mixed and the mixture is cured by heating and the other means on use.

The composition is cured at a heating temperature of preferably 35° C. to 350° C., and more preferably 50° C. to 250° C. The curing time is preferably 0.01 to 10 hours, and more preferably 0.05 to 6 hours. The curing reaction is performed under these conditions, whereby from the silicon-containing curable composition of the present invention can be obtained a cured product that is excellent in heat resistance, crack resistance, and alkali resistance, and has low dielectric constant, low outgassing moieties, and others. In particular, the cured product of the present invention is excellent in electrical properties, and has a specific dielectric constant of preferably 2.5 to 3.2.

The silicon-containing curable composition of the present invention has an adequate fluidity at room temperature (25° C.) and is excellent in handling property. The cured product of the composition is also excellent particularly in heat resistance and crack resistance. More specifically, the cured product exhibits 5% by mass of weight loss preferably at 400° C. or higher, and more preferably at 500° C. or higher. In addition, the cured product develops less crack. Further, the cured product has a fluidity of preferably 1 Pa·S or less, and more preferably 0.1 Pa·S or less at room temperature (25° C.) as measured with an E-type viscometer.

In the silicon-containing curable composition of the present invention, the curing reaction proceeds promptly by the effects of curing reaction catalyst, the hydrosilylation catalyst of component (C) (for example, platinum-based catalysts), between the Si—H groups of component (A) and the carbon-carbon double bonds (for example, Si—CH=CH$_2$ group) that are contained in component (B) and have reactivity to the Si—H groups. Further, the silicon-containing curable composition of the present invention can be photo-cured by admixing a photo-reactive catalyst, because the composition is uniform and transparent and has an adequate transmittance of light such as ultraviolet light. A photo-reactive monomer or resin can be admixed, and also one or more of the components in the silicon-containing curable composition can have a photo-reactive group. Still further, the composition can provide a material excellent in mechanical, optical, and electrical properties including weather resistance, hardness, anti-staining property, flame retardancy, gas-barrier performance, flexibility, elongation, mechanical strength, electrical insulation, and low dielectric constant.

The silicon-containing curable composition of the present invention can be admixed with, as an optional component besides the above-mentioned ones, the other known various kinds of resins, fillers, additives, and others, as long as the objective performances of the present invention are not impaired. Further, various kinds of organic functional groups can be bonded to any one of the components (A), (B) and (C) so as to provide an additional function. Still further, a high performance composite material can be prepared by dispersing the other useful compounds in the matrix of the silicon-containing curable composition of the present invention or its cured product.

The various kinds of resins that can be optionally admixed include polyimide resin, polyether resin such as polyethylene glycol and polypropylene glycol, polyurethane resin, epoxy resin, phenol resin, polyester resin, melamine resin, polyamide resin, and polyphenylenesulfide resin.

An example of the additives that can be optionally admixed include an ultraviolet absorber, an antistatic agent, and an antioxidant.

An example of the fillers that can be optionally admixed include ceramics such as silicon nitride, aluminum nitride, boron nitride, and silicon carbide. These ceramics can be also used after organic modification.

EXAMPLES

The present invention will be further described in detail with reference to the following examples, but it should be construed that the invention is in no way limited to those examples. Note that, "parts" and "%" appeared in the Examples are in terms of mass.

Synthesis Example 1

Synthesis of Component (A) Prepolymer-1

A reaction solution containing 100 parts of 1,3,5,7-tetramethyl cyclotetrasiloxane, 100 parts of 1,4-bis(dimethylvinylsilyl)benzene, 60 parts of toluene, and 0.0005 part of platinum-carbonylvinylmethyl complex (Ossko catalyst) was refluxed for 5 hours while stirring. The solvent was distilled out of the reaction solution at 70° C. under vacuum to obtain a component (A) prepolymer-1.

The prepolymer-1 had a molecular weight of Mw=3,000 as measured with GPC, and a hydrosilyl group (Si—H group) content of 5.3 mmol/g as measured with $^1$H-NMR.

Synthesis Example 2

Synthesis of Component (A) Prepolymer-2

Synthesis of precursor 1,5-divinyl-1,1,5,5-tetramethyl-3,3-diphenyltrisiloxane

At first, as a prepolymer-2 precursor, 1,5-divinyl-1,1,5,5-tetramethyl-3,3-diphenyltrisiloxane was synthesized. 100 parts of diphenylsilane diol were dispersed in 450 parts of toluene, and after 120 parts of pyridine were added, the resulting dispersion was stirred. To the suspension were added 170 parts of vinyldimethylchlorosilane. After reacting 2 hours at 50° C., the reaction was terminated by adding ion exchange water.

The water layer was removed from the resulting reaction solution and the solvent is distilled out of the reaction solution so as to obtain a silicon-containing divinyl compound (1,5-divinyl-1,1,5,5-tetramethyl-3,3-diphenyltrisiloxane).

The above silicon-containing divinyl compound had a molecular weight of Mw=384 as measured with GC-MS, and a vinyl group content of 4.99 mmol/g as measured with $^1$H-NMR.

GC-MS column: HP-1 manufactured by Hewlett Packard Company, 30 m×300 mm

After that, a reaction solution containing 100 parts of 1,3,5,7-tetramethylcyclotetrasiloxane, 130 parts of 1,5-divinyl-1,1,5,5-tetramethyl-3,3-diphenyltrisiloxane, 500 parts of hexane and 0.0005 part of platinum-divinyltetramethyldisiloxane complex (Karstedt catalyst) was refluxed for 2 hours while stirring. The solvent was distilled out of the reaction solution at 70° C. under vacuum to obtain a silicon-containing hydrosilyl prepolymer-2.

The silicon-containing hydrosilyl prepolymer-2 had a molecular weight of Mw=2,500 as measured with GPC, and a hydrosilyl group content of 4.9 mmol/g as measured with $^1$H-NMR.

Synthesis Example 3

Synthesis of Component (A) Prepolymer-3

A reaction solution containing 100 parts of 1,3,5,7-tetramethylcyclotetrasiloxane, 50 parts of divinylbenzene, 70 parts of 1-methoxy-2-propanolacetate, and 0.0001 part of platinum-carbonylvinylmethyl complex (Ossko catalyst) was refluxed for 6 hours while stirring. The solvent was distilled out of the reaction solution at 50° C. under vacuum to obtain a component (A) prepolymer-3.

The prepolymer-3 had a molecular weight of Mw=140,000 as measured with GPC, and a hydrosilyl group (Si—H group) content of 5.2 mmol/g as measured with $^1$H-NMR.

Synthesis Example 4

Synthesis of Component (B) Cyclic Siloxane Compound 1

In a mixed solution prepared by adding and mixing 300 parts of 1,4-dioxane and 300 parts of hydrochloric acid, a mixture of 210 parts of methylvinyldichlorosilane and 90 parts of phenylmethyldichlorosilane was added dropwise. After they were reacted for 30 minutes at room temperature while hydrochloric acid produced by hydrolysis reaction was recovered, they were further reacted for 3 hours at 70° C. The upper layer of the two liquid layers separated after the reaction was purified by vacuum distillation with a vacuum pump at 120 to 140° C. to obtain a component (B) cyclic siloxane compound 1 represented by formula (12).

The GC-MS analysis showed that the cyclic siloxane compound-1 contained a moiety having a molecular weight of 395 in an amount of 85% or more in terms of the area ratio. The FT-IR analysis showed that the cyclic siloxane compound-1 had no absorption of hydroxyl group assigned to the absorption range of 3200 to 3600 cm$^{-1}$. Further, the $^1$H-NMR analysis showed that the molar ratio of vinyl group to phenyl group was 3.3:1.0.

[Formula 12]

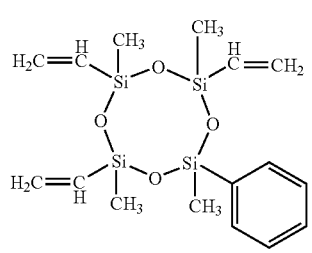

Formula (12)

Synthesis Example 5

Synthesis of Component (B) Cyclic Siloxane Compound 2

In a mixed solution prepared by adding and mixing 300 parts of 1,4-dioxane and 300 parts of hydrochloric acid, a mixture of 140 parts of methylvinyldichlorosilane and 180 parts of phenylmethyldichlorosilane was added dropwise. After they were reacted for 30 minutes at room temperature while hydrochloric acid produced by hydrolysis reaction was recovered, they were further reacted for 3 hours at 70° C. The upper layer of the two liquid layers separated after reaction was purified by vacuum distillation with a vacuum pump at 135 to 150° C. to obtain a component (B) cyclic siloxane compound 2 represented by formula (13).

The GC-MS analysis showed that the cyclic siloxane compound 2 contained a moiety having a molecular weight of 445 in an amount of 85% or more in terms of the area ratio. The FT-IR analysis showed that the cyclic siloxane compound 2 had no absorption of hydroxyl group assigned to the absorption range of 3200 to 3600 cm$^{-1}$ in. Further, the $^1$H-NMR analysis showed that the molar ratio of vinyl group to phenyl group was 1.2:1.0.

[Formula 13]

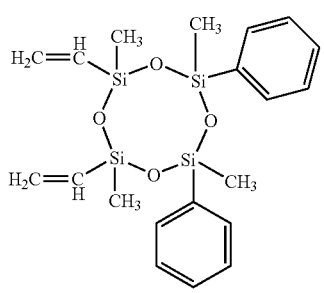

Formula (13)

Synthesis Example 6

Synthesis of Component (B) Cyclic Siloxane Compound 3

A component (B) cyclic siloxane compound 3 was obtained by mixing 50 parts of the cyclic siloxane compound 1 obtained in Synthesis Example 4 and 50 parts of the cyclic siloxane compound 2 obtained in Synthesis Example 5.

Synthesis Example 7

Synthesis of Component (B) Cyclic Siloxane Compound 4

In a mixed solution prepared by adding and mixing 300 parts of 1,4-dioxane and 300 parts of hydrochloric acid, 280 parts of methylvinyldichlorosilane were added dropwise. After they were reacted for 30 minutes at room temperature while hydrochloric acid produced by hydrolysis reaction was recovered, they were further reacted for 3 hours at 70° C. The upper layer of the two liquid layers separated after the reaction was purified by vacuum distillation with a vacuum pump at 120° C. or lower to obtain a component (B) cyclic siloxane compound 4 represented by formula (14).

The GC-MS analysis showed that the cyclic siloxane compound 4 had a molecular weight of 345. The FT-IR analysis showed that the cyclic siloxane compound 4 has no absorption of hydroxyl group assigned to the absorption range of 3200 to 3600 cm$^{-1}$. The $^1$H-NMR analysis showed that the vinyl group content was 11.6 mmol/g.

[Formula 14]

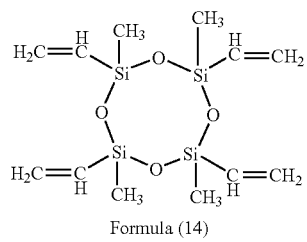

Formula (14)

Example 1

Silicon-Containing Curable Composition-1

A silicon-containing curable composition-1 of the present invention was obtained by mixing 100 parts of the component (A) prepolymer-1 obtained in Synthesis Example 1, 67 parts of the component (B) cyclic siloxane compound 1 obtained in Synthesis Example 4, and 0.0001 part of the component (C) platinum-carbonylvinylmethyl complex.

Thus obtained silicon-containing curable composition-1 was cured by the following method to obtain a cured product-1. No fume was released during curing. A colorless transparent hard cured product was obtained.

<Curing Method>

1) Curing Method for Preparing Test Specimens Used for Curing Property Verification, Heat Resistance Test, and Outgassing Test A curable composition was uniformly cast in a Teflon™ mold, preliminary heated for 30 minutes on a hot plate regulated at 30° C., further heated for 1 hour on a hot plate regulated at 200° C. to obtain a cured product.

2) Curing Method for Preparing Test Specimens Used for Crack Resistance Test and Alkali Resistance Test A curable composition is spin-cast on a clean and dried glass substrate to form a uniform thin film (SOG film), preliminary heated for 30 minutes on a hot plate regulated at 130° C., and further heated for 1 hour on a hot plate regulated at 200° C. to obtain a cured product.

3) Curing Method for Preparing Test Specimens Used for Specific Dielectric Constant Test A curable composition is uniformly coated on a glass plate having transparent electrodes, preliminary heated for 30 minutes on a hot plate regulated at 130° C., and further heated for 1 hour on a hot plate regulated at 200° C. to obtain a cured product.

Example 2

Silicon-Containing Curable Composition-2

A silicon-containing curable composition-2 of the present invention was obtained by mixing 100 parts of the component (A) prepolymer-2 obtained in Synthesis Example 2, 62 parts of the component (B) cyclic siloxane compound 1 obtained in Synthesis Example 4, and 0.0001 part of the component (C) platinum-carbonylvinylmethyl complex.

Thus obtained silicon-containing curable composition-2 was cured by the same curing method as used in example 1 to obtain a cured product-2. No fume was released during curing. A colorless transparent hard cured product was obtained.

Example 3

Silicon-Containing Curable Composition-3

A silicon-containing curable composition-3 of the present invention was obtained by mixing 100 parts of the component (A) prepolymer-3 obtained in Synthesis Example 3, 66 parts of the component (B) cyclic siloxane compound 1 obtained in Synthesis Example 4, and 0.0001 part of the component (C) platinum-carbonylvinylmethyl complex.

Thus obtained silicon-containing curable composition-3 was cured by the same curing method as used in Example 1 to obtain a cured product-3. No fume was released during curing. A colorless transparent hard cured product was obtained.

Example 4

Silicon-Containing Curable Composition-4

A silicon-containing curable composition-4 of the present invention was obtained by mixing 100 parts of the component (A) prepolymer-1 obtained in Synthesis Example 1, 110 parts of the component (B) cyclic siloxane compound 2 obtained in Synthesis Example 5, and 0.0001 part of the component (C) platinum-carbonylvinylmethyl complex.

Thus obtained silicon-containing curable composition-4 was cured by the same curing method as used in Example 1 to obtain a cured product-4. No fume was released during curing. A colorless transparent hard cured product was obtained.

Example 5

Silicon-Containing Curable Composition-5

A silicon-containing curable composition-5 of the present invention was obtained by mixing 100 parts of the component (A) prepolymer-1 obtained in Synthesis Example 1, 83.5 parts of the component (B) cyclic siloxane compound 3 obtained in Synthesis Example 6, and 0.0001 part of the component (C) platinum-carbonylvinylmethyl complex.

Thus obtained silicon-containing curable composition-S was cured by the same curing method as used in Example 1 to obtain a cured product-5. No fume was released during curing. A colorless transparent hard cured product was obtained.

Example 6

Silicon-Containing Curable Composition-6

A silicon-containing curable composition-6 of the present invention was obtained by mixing 100 parts of the component (A) prepolymer-1 obtained in Synthesis Example 1, 46 parts of the component (B) cyclic siloxane compound 4 obtained in Synthesis Example 7, and 0.0005 part of the component (C) platinum-divinyltetramethyldisiloxane complex (Karstedt catalyst).

Thus obtained silicon-containing curable composition-6 was cured by the same curing method as used in Example 1 to obtain a cured product-6. No fume was released during curing. A colorless transparent hard cured product was obtained.

Example 7

Silicon-Containing Curable Composition-7

A silicon-containing curable composition-7 of the present invention was obtained by mixing 100 parts of the component (A) prepolymer-3 obtained in Synthesis Example 3, 108 parts of the component (B) cyclic siloxane compound 2 obtained in Synthesis Example 5, and 0.0001 part of the component (C) platinum-carbonylvinylmethyl complex.

Thus obtained silicon-containing curable composition-7 was cured by the same curing method as used in Example 1 to obtain a cured product-7. No fume was released during curing. A colorless transparent hard cured product was obtained.

Example 8

Silicon-Containing Curable Composition-8

A silicon-containing curable composition-8 of the present invention was obtained by mixing 100 parts of the component (A) prepolymer-3 obtained in Synthesis Example 3, 82 parts of the component (B) cyclic siloxane compound 3 obtained in Synthesis Example 6, and 0.0001 part of the component (C) platinum-carbonylvinylmethyl complex.

Thus obtained silicon-containing curable composition-8 was cured by the same curing method as used in Example 1 to obtain a cured product-8. No fume was released during curing. A colorless transparent hard cured product was obtained.

Example 9

Silicon-Containing Curable Composition-9

A silicon-containing curable composition-9 of the present invention was obtained by mixing 100 parts of the component (A) prepolymer-3 obtained in Synthesis Example 3, 45 parts of the component (B) cyclic siloxane compound 4 obtained in Synthesis Example 7, and 0.0005 part of the component (C) platinum-divinyltetramethyldisiloxane complex (Karstedt catalyst).

Thus obtained silicon-containing curable composition-9 was cured by the same curing method as used in Example 1 to obtain a cured product-9. No fume was released during curing. A colorless transparent hard cured product was obtained.

Example 10

Silicon-Containing Curable Composition-10

A silicon-containing curable composition-10 of the present invention was obtained by mixing 100 parts of the component (A) prepolymer-1 obtained in Synthesis Example 1, 67 parts of the component (B) cyclic siloxane compound 1 obtained in Synthesis Example 4, 0.0001 part of the component (C) platinum-carbonylvinylmethyl complex, and 19 parts of silicon dioxide fine particles as an optional component.

Thus obtained silicon-containing curable composition-10 was cured by the same curing method as used in Example 1 to obtain a cured product-10. No fume was released during curing. A colorless transparent hard cured product was obtained.

Comparative Example 1

A comparative curable composition-1 was obtained by mixing 100 parts of 1,3,5,7-tetramethylcyclotetrasiloxane, 205 parts of 1,4-bis(dimethylvinylsilyl)benzene, and 0.0005 part of platinum-divinyltetramethyldisiloxane complex (Karstedt catalyst). Thus obtained comparative curable composition-1 was cured by the same curing method as used in Example 1 to obtain a comparative cured product-1. White fume was released during curing. Volatile moieties were found to fly apart.

Comparative Example 2

A comparative curable composition-2 was obtained by mixing 100 parts of 1,3,5,7-tetramethylcyclotetrasiloxane, 108 parts of divinylbenzene, and 0.0005 part of platinum-divinyltetramethyldisiloxane complex. Thus obtained comparative curable composition-2 was cured by the same curing method as used in Example 1 to obtain a comparative cured product-2. White fume was released during curing. Volatile moieties were found to fly apart.

Comparative Example 3

A comparative curable composition-3 was obtained by mixing 100 parts of the prepolymer-1 obtained in Synthesis Example 1, 65 parts of 1,4-bis(dimethylvinylsilyl)benzene, and 0.0005 part of platinum-carbonylvinylmethyl complex. Thus obtained comparative curable composition-3 was cured by the same curing method as used in Example 1 to obtain a comparative cured product-3. White fume was released during curing. Volatile moieties were found to fly apart.

Comparative Example 4

A comparative curable composition-4 was obtained by mixing 100 parts of the prepolymer-2 obtained in Synthesis Example 2, 60 parts of 1,4-bis(dimethylvinylsilyl)benzene, and 0.0005 part of platinum-divinyltetramethyldisiloxane complex. Thus obtained comparative curable composition-4 was cured by the same curing method as used in Example 1 to obtain a comparative cured product-4. White fume was released during curing. Volatile moieties were found to fly apart.

Comparative Example 5

A comparative curable composition-5 was obtained by mixing 100 parts of the prepolymer-3 obtained in Synthesis Example 3, 64 parts of 1,4-bis(dimethylvinylsilyl)benzene, and 0.0005 part of platinum-carbonylvinylmethyl complex. Thus obtained comparative curable composition-5 was cured by the same curing method as used in Example 1 to obtain a comparative cured product-5. White fume was released during curing. Volatile moieties were found to fly apart.

Comparative Example 6

A comparative curable composition-6 was obtained by mixing 100 parts of the prepolymer-3 obtained in Synthesis Example 3, 34 parts of divinylbenzene, and 0.0005 part of platinum-divinyltetramethyldisiloxane complex. Thus obtained comparative curable composition-6 was cured by the same curing method as used in Example 1 to obtain a comparative cured product-6. White fume was released during curing. Volatile moieties were found to fly apart.

Comparative Example 7

A comparative curable composition-7 was obtained by mixing 100 parts of the prepolymer-3 obtained in Synthesis Example 3 and 43 parts of triallylisocyanurate. Thus obtained comparative curable composition-7 was cured by the same curing method as used in Example 1 to obtain a comparative cured product-7. White fume was released during curing. Volatile moieties were found to fly apart.

Comparative Example 8

A comparative curable composition-8 was obtained by mixing 100 parts of 1,3,5,7-tetramethylcyclotetrasiloxane, 211 parts of the cyclic siloxane compound 1 obtained in Synthesis Example 4, and 0.0005 part of platinum-divinyltetramethyldisiloxane complex. Thus obtained comparative curable composition-8 was cured by the same curing method as used in Example 1 to obtain a comparative cured product-8. White fume was released during curing. Volatile moieties were found to fly apart.

Comparative Example 9

A comparative curable composition-9 was obtained by mixing 100 parts of 1,4-bis(dimethylvinylsilyl)benzene, 130 parts of the cyclic siloxane compound 1 obtained in Synthesis Example 4, and 0.0005 part of platinum-divinyltetramethyldisiloxane complex. Thus obtained comparative curable composition-9 was cured by the same curing method as used in Example 1 to obtain a comparative cured product-9. White fume was released during curing. Volatile moieties were found to fly apart.

[Heat Resistance Test]

The cured products-1 to -10 obtained in Examples 1 to 10 and the comparative cured products-1 to -9 obtained in Comparative Examples 1 to 9 were subjected to heat resistance test using the evaluation method described below. The results are shown in Table 1. The temperature of 1% weight loss is shown on the upper and the temperature of 5% weight loss is shown on the lower in each column. These results show that the cured products-1 to -10 of the present invention have higher heat resisting temperature. To the contrary, the comparative cured products-1 to -9 have only lower heat resisting temperature. This is probably because the volatile moieties fly apart and the equivalence ratio between vinyl groups and Si—H groups becomes unbalanced.

<Evaluation Method for Heat Resistance Test>

For each cured product, the temperature of 1% weight loss and the temperature of 5% weight loss were measured with a thermal analysis instrument (TG-DTA).

Measurement instrument: SSC/5200 manufactured by Seiko Instruments Inc.

Measurement conditions: temperature range was 100 to 550° C., and temperature elevation speed was 110° C./minute.

[Crack Resistance Test]

The cured products-1 to -10 obtained in Examples 1 to 10 and the comparative cured products-1 to -9 obtained in Comparative Examples 1 to 9 were subjected to crack resistance test described below. The results are shown in Table 1. These results show that the cured products-1 to -10 of the present invention have crack resistance at high temperatures.

<Evaluation Method for Crack Resistance Test>

Each cured thin film formed on a glass plate (SOG film) was placed in a glass vessel on a hot plate; the thin film was heated to 350° C. in a nitrogen gas stream, and left for 1 hour; after heating was stopped under the nitrogen atmosphere, and the thin film was cooled to room temperature, the surface of the film was inspected by eye observation.

The thin film free of cracks was evaluated as ○, and the film with cracks was evaluated as x.

[Alkali Resistance Test]

The cured products-1 to -10 on glass plates (SOG thin films) obtained in Examples 1 to 10, and the comparative cured products-1 to -9 (SOG thin films) obtained in Comparative Examples 1 to 9 were subjected to alkali resistance test by the evaluation method described below. The results are shown in Table 1.

These results show that the cured products-1 to -10 of the present invention have alkali resistance.

<Evaluation Method for Alkali Resistance Test>

Each cured thin film formed on a glass plate was immersed in an amine test solution. After that, the test specimen (SOG film) was washed with ion exchange water, air-dried, and observed under a microscope to inspect whether the film cracked or not.

The SOG film free of cracks was evaluated as ○, and the SOG film with cracks was evaluated as x.

Amine test solution: an aqueous solution dissolving 26% of tetramethylammonium hydroxide.

Immersing conditions: 80° C. for 1 hour

[Specific Dielectric Constant Test]

The cured products-1 to -10 that were cured on glass plates with transparent electrodes and obtained in Examples 1 to 10, and the comparative cured products-1 to -9 that were cured on glass plates with transparent electrodes and obtained in Comparative Examples 1 to 9 were subjected to specific dielectric constant test described below. The results are shown in Table 1. The dielectric constant at 1 kHz is shown on the upper and the dielectric constant at 10 kHz is shown on the lower in each column.

These results show that the cured products-1 to -10 of the present invention are low dielectric constant compounds having a specific dielectric constant of 2.7 to 2.9.

<Evaluation Method for Specific Dielectric Constant Test>

Each cured product formed by coating and curing on a glass plate with transparent electrodes was placed in a vacuum evaporation chamber; and then high purity aluminum was deposited in 200 nm thickness under a reduced pressure at $10^{-3}$ Pa or less to form a counter electrode. After the specimen was taken out of the chamber, the charge at each frequency of 1 kHz and 10 kHz was measured with an LCR meter 4262A manufactured by Yokogawa Hewlett-Packard Co., Ltd. The specific dielectric constant was calculated from the charge thus measured, thickness, and aluminum electrode area.

[Outgassing Measurement Test]

The cured products-1 to -10 obtained in Examples 1 to 10 and the comparative cured products-1 to -9 obtained in Comparative Examples 1 to 9 were subjected to outgassing measurement test using the evaluation method described below. The results are shown in Table 1.

These results show that the cured products-1 to -10 of the present invention have low outgassing. To the contrary, the comparative cured products-1 to -9 have high outgassing, because they contain a large amount of remaining volatile moieties.

<Evaluation Method for Outgassing Measurement Test>

The mass change of each cured product was measured continuously for 1 hour at 350° C. using the same instrument (TG/DTA) as used in the heat resistance measurement. The outgassing amount was estimated to be equivalent to the loss in the mass.

Unit: % by mass

Measurement instrument: SSC/5200 manufactured by Seiko Instruments Inc

TABLE 1

|  | Heat resistance test (° C.) | Crack resistance test | Alkali resistance test | Specific dielectric constant test | Outgassing measurement test wt % |
|---|---|---|---|---|---|
| Example 1 | 512 | ○ | ○ | 2.7 | 0.1> |
| Cured product-1 | 542 |  |  | 2.7 |  |
| Example 2 | 420 | ○ | ○ | 2.8 | 0.1 |
| Cured product-2 | 546 |  |  | 2.8 |  |
| Example 3 | 502 | ○ | ○ | 2.9 | 0.1> |
| Cured product-3 | 546 |  |  | 2.9 |  |
| Example 4 | 443 | ○ | ○ | 2.8 | 0.1> |
| Cured product-4 | 528 |  |  | 2.8 |  |
| Example 5 | 464 | ○ | ○ | 2.7 | 0.2 |
| Cured product-5 | 524 |  |  | 2.7 |  |
| Example 6 | 420 | ○ | ○ | 2.7 | 0.1 |
| Cured product-6 | 510 |  |  | 2.7 |  |
| Example 7 | 498 | ○ | ○ | 2.9 | 0.1> |
| Cured product-7 | 532 |  |  | 2.9 |  |
| Example 8 | 470 | ○ | ○ | 2.8 | 0.1> |
| Cured product-8 | 525 |  |  | 2.8 |  |
| Example 9 | 422 | ○ | ○ | 2.8 | 0.2 |
| Cured product-9 | 513 |  |  | 2.8 |  |
| Example 10 | 520 | ○ | ○ | 2.7 | 0.1> |
| Cured product-10 | 551 |  |  | 2.7 |  |
| Comparative Example 1 | 438 | X | X | 2.8 | 1.1 |
| Comparative curable composition-1 | 491 |  |  | 2.8 |  |
| Comparative Example 2 | 270 | X | X | 2.9 | 6.1 |
| Comparative curable composition-2 | 330 |  |  | 2.9 |  |

TABLE 1-continued

| | Heat resistance test (° C.) | Crack resistance test | Alkali resistance test | Specific dielectric constant test | Outgassing measurement test wt % |
|---|---|---|---|---|---|
| Comparative Example 3 | 351 | X | X | 2.8 | 2.1 |
| Comparative curable composition-3 | 454 | | | 2.8 | |
| Comparative Example 4 | 348 | X | X | 2.8 | 3.2 |
| Comparative curable composition-4 | 450 | | | 2.8 | |
| Comparative Example 5 | 350 | X | X | 2.9 | 2.0 |
| Comparative curable composition-5 | 455 | | | 2.9 | |
| Comparative Example 6 | 298 | X | X | 3.0 | 6.5 |
| Comparative curable composition-6 | 340 | | | 3.0 | |
| Comparative Example 7 | 395 | X | ○ | 3.0 | 1.7 |
| Comparative curable composition-7 | 440 | | | 3.0 | |
| Comparative Example 8 | 440 | X | X | 2.8 | 1.1 |
| Comparative curable composition-8 | 490 | | | 2.8 | |
| Comparative Example 9 | 275 | ○ | ○ | 2.9 | 6.3 |
| Comparative curable composition-9 | 338 | | | 2.9 | |

Note that, numerical values and symbols in Table 1 denote as follows.

Heat resistance test: upper=temperature of the loss of 1% weight, lower temperature of the loss of 5% weight Crack resistance test: ○=no cracks developed, x=cracks developed Amine resistance test: good marking with ○=no cracks developed, poor marking with x=cracks developed Specific dielectric constant: upper=specific dielectric constant at 1 kHz, lower=specific dielectric constant at 10 kHz Outgassing measurement test: unit=% by mass

INDUSTRIAL APPLICABILITY

The silicon-containing curable composition of the present invention is excellent in storage stability, transparency, handling property, curing property, and others. Further, the cured product of the composition is excellent in properties such as heat resistance, crack resistance, alkali resistance, optical property, electrical property, low outgassing performance, and can be used as the curable composition. In addition, the composition can be applied to sealing materials such as display material, optical material, recording material and semiconductor material and to high-voltage insulating materials, in the field of electrical and electronics; also as for the purpose of insulation, anti-vibration, water-proof and damp-proof, by using a film forming technique such as spin-cast, potting and dipping, applied to test mother molds for plastics parts, coating material, interlayer insulation films, insulating gaskets, heat-shrinking rubber tubes, O-rings, sealing and protection material for display devices, optical guides, optical fiber protection material, optical lenses, adhesives for optical instruments, highly heat-resistant adhesives, highly heat-dissipating material, highly heat-resistant sealing material, solar cell and fuel cell members, solid electrolytes for batteries, insulating coating material, copy machine photoconductor drums, and gas separation membranes. Further, in the field of building and construction, the composition can be applied to concrete protection material, linings, soil injection material, sealing material, heat or cool storage material, glass coatings, and others. Still further, in the field of medical materials, the composition can be applied to tubes, sealing material, coating material, sealing material for sterilization apparatuses, contact lenses, oxygen-enriched membranes, and others.

The invention claimed is:

1. A silicon-containing curable composition, comprising:

a prepolymer (A) containing two or more Si—H groups per molecule obtained by hydrosilylation reaction of one kind or more selected from each of components (α) and components (β) described below;

a cyclic siloxane compound (B) containing per molecule two or more carbon-carbon double bonds that have reactivity with the Si—H groups; and a hydrosilylation catalyst (C);

wherein the component (α) is a cyclic siloxane compound represented by formula (1) and contains two or more Si—H groups per molecule,

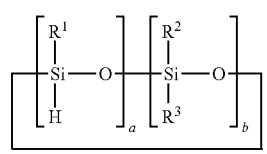

Formula (1)

wherein $R^1$, $R^2$ and $R^3$ each are an alkyl group having 1 to 6 carbon atoms or a phenyl group, may be the same or different, a is any number from 2 to 10, b is any number from 0 to 8, and $a+b \geq 2$, and wherein the component (β) is a compound of formula (2) or formula (4),

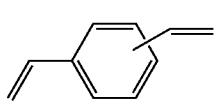

Formula (2)

-continued

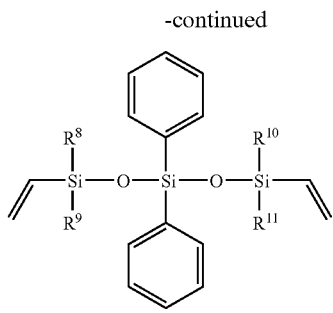

Formula (4)

wherein $R^8$, $R^9$, $R^{10}$ and $R^{11}$ each are an alkyl group having 1 to 6 carbon atoms or a phenyl group, and may be the same or different.

2. The silicon-containing curable composition according to claim 1, wherein
the component (B) is a cyclic siloxane compound represented by formula (5), containing per molecule two or more carbon-carbon double bonds that have reactivity with the Si—H groups;

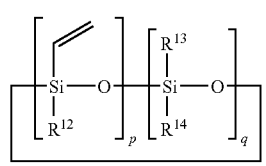

[Formula 5]

Formula (5)

wherein $R^{12}$, $R^{13}$ and $R^{14}$ each are an alkyl group having 1 to 6 carbon atoms or a phenyl group, and may be the same or different, p is any number from 2 to 10, q is any number from 0 to 8, and $p+q \geqq 2$.

3. A cured product obtained by curing the silicon-containing curable composition according to claim 1.

4. The silicon-containing curable composition according to claim 1, wherein
the component (B) is a cyclic siloxane compound represented by formula (5), containing per molecule two or more carbon-carbon double bonds that have reactivity with the Si—H groups;

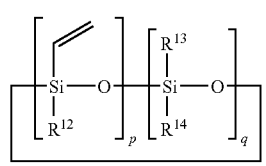

[Formula 5]

Formula (5)

wherein $R^{12}$, $R^{13}$ and $R^{14}$ each are a methyl group or a phenyl group, and may be the same or different, p is any number from 2 to 4, q is any number from 1 to 3, and $p+q \geqq 2$.

5. A cured product obtained by curing the silicon-containing curable composition according to claim 2.

6. A cured product obtained by curing the silicon-containing curable composition according to claim 4.

7. The silicon-containing curable composition according to claim 1, wherein the component (B) is a cyclic siloxane compound represented by formula (8)

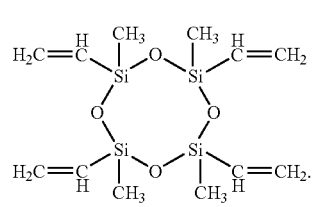

Formula (8)

8. The silicon-containing curable composition according to claim 1, wherein the component (B) is a cyclic siloxane compound represented by formula (9)

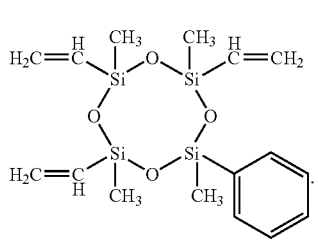

Formula (9)

9. The silicon-containing curable composition according to claim 1, wherein the component (B) is a cyclic siloxane compound represented by formula (10)

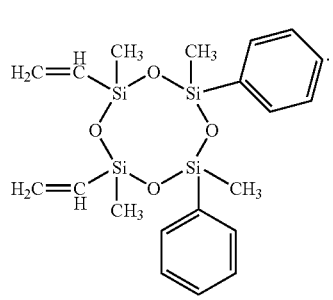

Formula (10)

10. The silicon-containing curable composition according to claim 1, wherein the component (B) is a cyclic siloxane compound represented by formula (11)

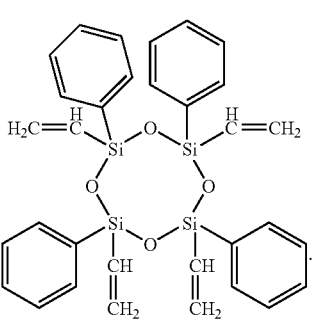

Formula (11)

11. The silicon-containing curable composition according to claim 1, wherein the component (B) is a cyclic siloxane compound represented by formula (12)

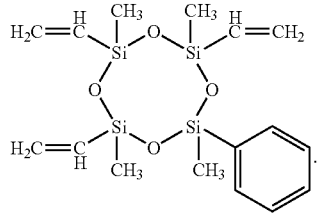

Formula (12)

12. The silicon-containing curable composition according to claim 1, wherein the component (B) is a cyclic siloxane compound represented by formula (13)

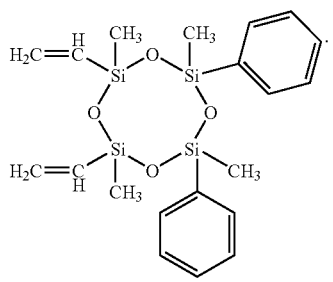

Formula (13)

13. The silicon-containing curable composition according to claim 1, wherein the component (B) is a cyclic siloxane compound represented by formula (14)

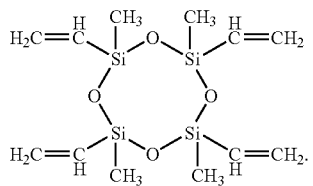

Formula (14)

14. A silicon-containing curable composition, comprising:
a prepolymer (A) containing two or more Si—H groups per molecule obtained by hydrosilylation reaction of one kind or more selected from each of components (α) and components (β) described below;
wherein the component (α) is a cyclic siloxane compound represented by formula (1) and contains two or more Si—H groups per molecule,

[Formula 1]

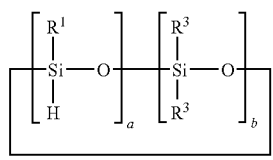

Formula (1)

wherein $R^1$, $R^2$ and $R^3$ each are an alkyl group having 1 to 6 carbon atoms or a phenyl group, may be the same or different, a is any number from 2 to 10, b is any number from 0 to 8, and $a+b \geq 2$, and wherein the component (β) is a compound of formula (2) or formula (4),

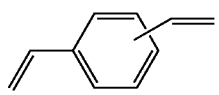

Formula (2)

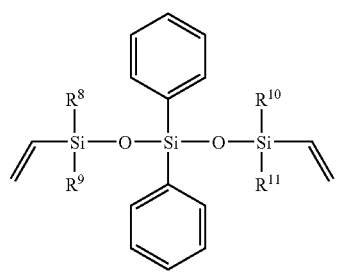

Formula (4)

wherein $R^8$, $R^9$, $R^{10}$ and $R^{11}$ each are an alkyl group having 1 to 6 carbon atoms or a phenyl group, and may be the same or different;

a cyclic siloxane compound (B) represented by one of formulas (8) to (14)

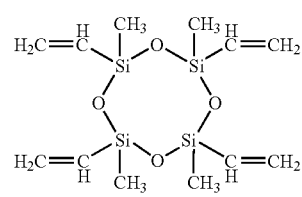

Formula (8)

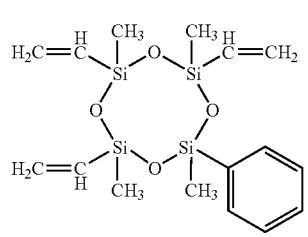

Formula (9)

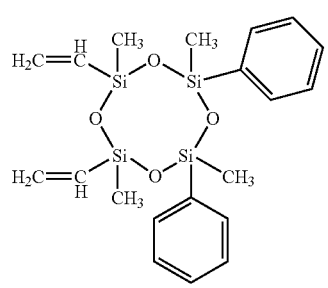

Formula (10)

-continued
Formula (11)
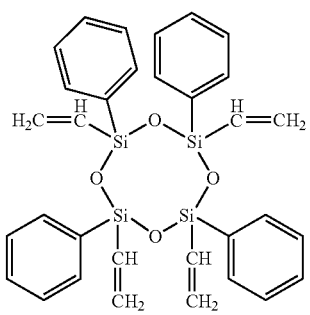
Formula (12)
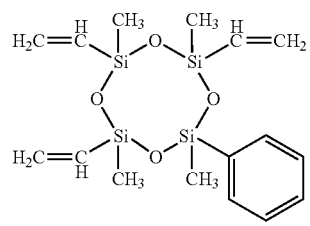
Formula (13)
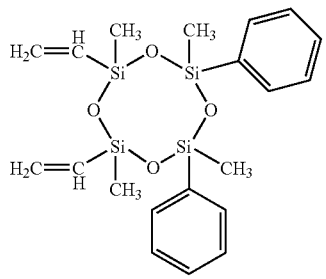
Formula (14)
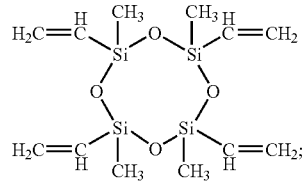
and a hydrosilylation catalyst (C).
* * * * *